US008522135B2

(12) United States Patent
Rasmussen

(10) Patent No.: US 8,522,135 B2
(45) Date of Patent: Aug. 27, 2013

(54) GENERATING A TRANSFORMATION DESCRIPTION DOCUMENT FOR TRANSFORMING MESSAGES

(75) Inventor: Glenn Rasmussen, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/478,864

(22) Filed: Jun. 5, 2009

(65) Prior Publication Data

US 2009/0307582 A1    Dec. 10, 2009

Related U.S. Application Data

(60) Provisional application No. 61/059,504, filed on Jun. 6, 2008.

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)

(52) U.S. Cl.
USPC ............................ 715/236; 715/234; 715/239

(58) Field of Classification Search
USPC .......................................... 715/236, 234, 239
See application file for complete search history.

(56) References Cited

U.S. PATENT DOCUMENTS

| | | | |
|---|---|---|---|
| 7,281,018 B1* | 10/2007 | Begun et al. ........................... | 1/1 |
| 7,735,062 B2* | 6/2010 | de Seabra e Melo et al. | 717/120 |
| 2002/0013790 A1* | 1/2002 | Vandersluis .................. | 707/514 |
| 2002/0073119 A1* | 6/2002 | Richard ......................... | 707/513 |
| 2002/0188743 A1 | 12/2002 | Schaffrath | |
| 2004/0117425 A1* | 6/2004 | Berkland et al. .............. | 709/200 |
| 2004/0220998 A1* | 11/2004 | Shenfield et al. ............. | 709/201 |
| 2005/0039117 A1* | 2/2005 | Lwo ............................... | 715/513 |
| 2005/0144557 A1* | 6/2005 | Li et al. .......................... | 715/513 |
| 2005/0204347 A1* | 9/2005 | Jurkiewicz et al. ........... | 717/137 |
| 2006/0136351 A1* | 6/2006 | Angrish et al. .................... | 707/1 |
| 2006/0195851 A1 | 8/2006 | Curtis et al. | |
| 2006/0248445 A1 | 11/2006 | Rogerson et al. | |
| 2007/0143285 A1* | 6/2007 | Drumm et al. ..................... | 707/5 |
| 2007/0244938 A1* | 10/2007 | Michael et al. ............... | 707/204 |
| 2008/0120689 A1* | 5/2008 | Morris et al. ..................... | 726/1 |
| 2008/0313728 A1* | 12/2008 | Pandrangi et al. .............. | 726/12 |

(Continued)

OTHER PUBLICATIONS

Shinn et al., "Generating XSLT Scripts for the Fast Transformation of XML Documents", 2005, ACM, pp. 1098-1099.*

(Continued)

*Primary Examiner* — Doug Hutton, Jr.
*Assistant Examiner* — Soumya Dasgupta
(74) *Attorney, Agent, or Firm* — Yeen Tham; Edell, Shapiro & Finnan, LLC

(57) ABSTRACT

The present disclosure provides a system and method of generating a transformation specification document describing transformations for transforming a received message conforming to a second interface definition to a message conforming to a first interface definition. The system and method comprise loading the first interface definition into memory; loading the second interface definition into memory; determining all additional elements of the second interface definition loaded into memory not contained in the first interface definition loaded into memory; generating processing logic for removing all of the determined additional elements from the received message; and generating the transformation specification document using the generated processing logic. The present disclosure further relates to a computer program product generating a transformation specification document.

20 Claims, 11 Drawing Sheets

(56) References Cited

U.S. PATENT DOCUMENTS

2009/0307324 A1  12/2009 Rasmussen
2009/0313621 A1* 12/2009 Dewa ............................. 718/1
2010/0185902 A1   7/2010 Fang et al.
2010/0293479 A1* 11/2010 Rousso et al. ................ 715/760
2010/0293490 A1* 11/2010 Rousso et al. ................ 715/771

OTHER PUBLICATIONS

Gu et al., "XSLT Transformation from UML models to LQN performance models", 2002, ACM, pp. 227-234.*

* cited by examiner

```
<wsdl name="Interface-V1">
    <wsdl types>
        <name="typeA">
            <element name="varA" type="String">
            <element name="varB" type="Integer">
        </"typeA">
    </wsdl type>

<wsdl messages>
        <name="requestA">
            <message-part name="requestA-part" type="Integer"/>
        </"requestA">
        <name="responseA">
            <message-part name="responseA-part" type"TypeA"/>
        </"responseA">
    </wsdl messages>

<wsdl portTypes>
        <operation name="getTypeA">
            <input message="requestA"/>
            <output message="responseA"/>
        </operation>
    </portTypes>
</"Interface-V1>"
```

802 — types section
804 — messages section
806 — portTypes section
800

Figure 8a

```
<wsdl name="Interface-V2">
    <wsdl types>
        <name="typeA">
            <element name="varA" type="String">
            <element name="varB" type="Integer">
            <element name="varC" type="String">
        </"typeA">
    </wsdl type>

<wsdl messages>
        <name="requestA">
            <message-part name="requestA-part" type="Integer"/>
        </"requestA">
        <name="responseA">
            <message-part name="responseA-part" type"TypeA"/>
        </"responseA">
    </wsdl messages>

<wsdl portTypes>
        <operation name="getTypeA">
            <input message="requestA"/>
            <output message="responseA"/>
        </operation>
    </portTypes>
</"Interface-V2>"
```

802 — types block
804 — messages block
806 — portTypes block
810 — overall

Figure 8b

GENERATING A TRANSFORMATION DESCRIPTION DOCUMENT FOR TRANSFORMING MESSAGES

CROSS REFERENCE TO RELATED APPLICATIONS

The present application claims priority of U.S. provisional patent application No. 61/059,504, filed Jun. 6, 2008 and entitled "Generating a Transformation Description Document for Transforming Messages Between Formats," the contents of which are incorporated herein by reference in their entirety.

BACKGROUND

The Service Oriented Architecture (SOA) is a software architecture for implementing web applications. When using the SOA, an application is composed of a set of agents that communicate with each other using a defined set of Application Programming Interfaces (APIs) which may be described using a standard interface definition language (IDL), such as WSDL (Web Service Description Language) or some other language.

An agent that implements an interface is known as a provider or producer agent and an agent that uses an interface is known as a requester or consumer agent. An agent may be both a provider agent and requester agent.

Agents are loosely coupled together. The communication between agents occurs using the defined APIs. Two provider agents may be considered interchangeable if they implement the same set of APIs. Two requester agents may be considered interchangeable if they use the same set of APIs. An agent that is both a provider agent and requester agent may be considered interchangeable if they implement the same set of APIs and use the same set of APIs. An agent may be replaced with an interchangeable agent without requiring changes to other agents in the SOA application.

Developers of an SOA application, that may include both requester and producer agents, may develop the agents separately. The developers may update or modify the producer and requester agents independently, as long as they share a common interface. For example, a developer may update a requester agent by adding a better user interface for displaying information received from the producer agent. This new version of the requester agent can communicate with the producer agent using the same common interface as was used by the old requester agent. Likewise, the developers may update the producer agent, for example to generate information in a more efficient manner. So long as the new version of the producer agent implements the common interface used by the previous version of the producer agent, the requester agents will be able to communicate with the new producer agent.

Although agents are loosely coupled to other agents, they are tightly coupled to the interfaces. Agents are tightly coupled to the interfaces that they use or implement, since changing an interface requires changing both the producer agent and requestor agent that implement or use the interface. The tight coupling of agents to the interfaces causes problems for developing new SOA applications or components that may benefit from a different interface. In order to implement and use a new interface definition, both new requester agents and producer agents are required. It may be difficult to distribute all of the new components to update the old versions at the same time. This can result in an old requester agent trying to communicate with a new producer agent, or new requester agents trying to communicate with old producer agents, which will not work since they do not share a common interface.

Attempts to address this limitation have included isolating the core logic of the producer or requester agent from the interface implementation. This allows for different interfaces to be implemented using specific adaptors that compensate for differences between the interface and the core logic APIs. For example, a producer agent could be created with a new version of the core logic and an adaptor for implementing an older interface. The adaptor would be hard-coded and specific to both the new core version and the interface definition it is implementing. Another producer agent may also be created using the same core version but with a different adaptor that implements a new interface definition, for example, for supporting new features in the core version. An old requester agent can connect to the producer agent that includes the adaptor implementing the older interface. A new requester agent could connect to the producer agent that includes the adaptor implementing the new interface.

The use of adaptors for implementing an interface and adapting it to core logic provides flexibility in defining the interface, as well as the core logic, since both the interface and the core logic may change independently. However, whenever a new interface or new version of core logic is developed, a new adaptor needs to be created. Each adaptor is specific to a particular interface definition, and converts received messages into requests that can be handled by the specific core logic, as well as, converting messages from the core logic into messages that conform to the particular interface definition. As the core logic evolves, this solution requires that new adaptors be created for bridging the new core logic with the different agent interfaces. This can result in having to develop numerous adaptors to support different versions of interfaces, which may be difficult as the adapter requires specific knowledge of the functions of the new core logic. Each adaptor bridges messages from one version of an interface definition to the new core logic.

Another attempt to address this limitation requires maintaining multiple cores in a single component. Each core implements a particular version of the interface. This allows for the interface definition of the agent to change significantly over time since the older interface definition remains implemented by the core. However, this causes the agent to continually increase in size and complexity, making it more difficult to maintain the agent.

A further solution to the limitation is to force the responsibility of compatibility onto system administrators. This requires systems administrators to ensure that all components in the system use the correct version. While this solution simplifies the design and authoring of the agents, it is a difficult solution for system administrators, especially as the size of the system and number of agents increase.

It is desirable to have a mechanism to provide at least some flexibility to modify interfaces or core logic of agents, while remaining simple to maintain compatibility between versions.

SUMMARY

In accordance with an embodiment of the present disclosure, there is provided a method of generating a transformation specification document. The transformation specification document describes transformations for transforming a received message conforming to a second interface definition to a message conforming to a first interface definition. The method comprises: loading the first interface definition into memory; loading the second interface definition into memory; determining all additional elements of the second interface definition loaded into memory not contained in the first interface definition loaded into memory; generating processing logic for removing all of the determined additional elements from the received message; and generating the transformation specification document using the generated processing logic.

In accordance with a further embodiment of the present disclosure, there is provided a system generating a transformation specification document. The transformation specification document describes transformations for transforming a received message conforming to a second interface definition to a message conforming to a first interface definition. The system comprising: a processor executing instructions; and a memory, operatively coupled to the processor, storing instructions. The instructions when executed by the processor are operable to: load the first interface definition into memory; load the second interface definition into memory; determine all additional elements of the second interface definition loaded into memory not contained in the first interface definition loaded into memory; generate processing logic for removing all of the determined additional elements from the received message; and generate the transformation specification document using the generated processing logic.

In accordance with still a further embodiment of the present disclosure, there is provided a computer program product generating a transformation specification document. The transformation specification document describes transformations for transforming a received message conforming to a second interface definition to a message conforming to a first interface definition. The computer program product comprising: a computer usable medium having computer usable program code embodied therewith, the computer usable program code comprising: computer usable program code configured to load the first interface definition into memory; computer usable program code configured to load the second interface definition into memory; computer usable program code configured to determine all additional elements of the second interface definition loaded into memory not contained in the first interface definition loaded into memory; computer usable program code configured to generate processing logic for removing all of the determined additional elements from the received message; and computer usable program code configured to generate the transformation specification document using the generated processing logic.

BRIEF DESCRIPTION OF THE SEVERAL VIEWS OF THE DRAWINGS

Embodiments of the invention will be described with reference to the drawings in which:

FIGS. 8a and 8b depict illustrative interface definitions, in accordance with the present disclosure;

DETAILED DESCRIPTION

Figure 1:
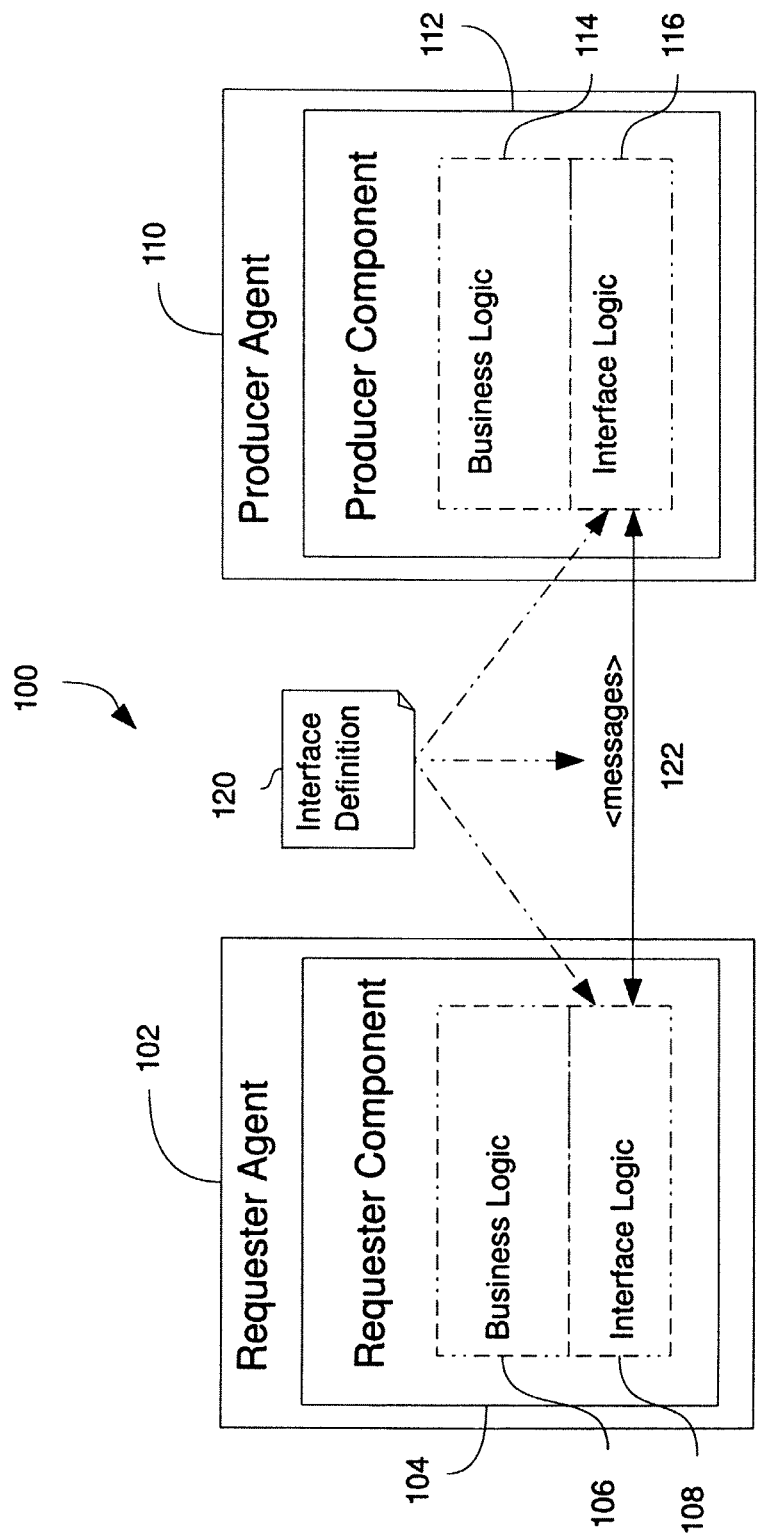
FIG. 1 depicts illustrative components of a service oriented architecture (SOA) application, in accordance with the present disclosure.

Illustrative embodiments of the present disclosure are described with reference to producer agents and requester agents. Although the description refers to these agents as distinct components, it is understood that an agent can act as both a producer and requester agent at the same time. For example, it is possible for a producer agent to produce information (to be consumed by a requester agent) by consuming information it requested from a different producer agent. In such a situation, the producer agent may implement an interface for sending and receiving information to a requester agent, and use another interface for communicating with the other agent. For the sake of clarity, the requester agent and producer agent are described as separate agents, and implement only a single interface definition.

An interface definition describes a contract between agents. The interface definition describes a format and semantics for the communication between the two agents. If both agents share a common interface definition, the agents can communicate with each other by sending messages that conform to the common interface definition. An interface definition describes an Application Programming Interface (API). An agent can communicate with an agent that implements an API by sending messages formatted according to the API. For example, the following listing describes a simple interface definition for a producer agent that receives an employee number and returns an employee name associated with the employee number.

Example Interface Definition:
Method name: getEmployee
  input: employeeNumber: Integer
  output: employeeInfo: employeeInformation
Type name: employeeInformation
  Name: String
  ID: Integer A producer agent that implements the interface definition will be able to receive a message containing an integer (the employeeNumber) and return a message containing data of the type employeeInformation, which has a string (the employeeInformation.Name) and an associated integer (the employeeInformation.ID). A requester agent that uses the interface definition may send a message containing an integer (the employee number) and receive in response a message containing data of the type employeeInformation (the employee name and employee ID). The interface definition provides a common language that the agents can use to communicate with each other. The interface definition describes the format of messages, and possibly the format of complex types used in the message.

The above listing of the example interface definition is not described in any particular interface definition language (IDL). It is understood that the interface could be described in a more formal IDL, such as a Web Service Description Language (WSDL).

The following listing lists an implementation of the example interface definition in pseudo code for both a provider or producer agent and a requester agent. It is understood that the listing is only for highlighting the implementation of the interface in the producer agent and requester agent.

```
providerAgent:
    employeeInformation {
        Name : String
        ID : Integer
    }
    employeeInformation getEmployee(employeeNumber : Integer) {
        employeeInfo : employeeInformation
        employeeInfo = infoOfEmployeeNumber(employeeNumber)
        return employeeInfo
    }
requesterAgent:
    employeeInformation {
        Name : String
        ID : Integer
    }
    displayEmployee(num : Integer){
        employee : employeeInformation
        employee = providerAgent.getEmployee(num)
        display(employee.Name)
        display(employee.ID)
    }
```

The implementation of the illustrative requester agent sends a message to the provider agent, using the common interface, requesting the employee information associated with an employee ID number. The provider agent receives the message, retrieves the information, for example, from a database, and sends a response back to the requester agent. The requester agent receives the response and may, for example, display the results.

Referring to FIG. 1, there is shown illustrative components of an SOA application 100. The SOA application 100 comprises two co-operating agents 102, 110. A requester agent 102 may send and receive messages 122 to and from a producer agent 110. The requester agent 102 may comprise a requester component 104. The requester component 104 may include business logic 106 and interface logic 108 for using an interface implemented by another agent. The business logic 106 and the interface logic 108 do not need to be separate as depicted in FIG. 1. The business logic 106 is used by the requester agent 102 to consume information in a desired way. For example, the business logic 106 may display received information, it may process the received information and generate new requests to other agents, it may produce a response to a different agent based on the information, etc. The requester agent 102 may comprise further components in addition to the requester component, such as additional requester components for communicating with different agents. The interface definition 120 describes a required format of messages for sending and receiving information to and from the producer agent 110. The interface logic 108 uses the interface definition 120 to send and receive information to and from the producer agent 110 using messages 122. The format of the messages 122 conform to the interface definition 120.

In order for the requester agent 102 to have information to consume, the producer agent 110 may send information. The producer agent 110 is similar to the requester agent 102; however, it includes a producer component 112 instead of a requester component 104. The producer component 112 may receive, process, and send information to and from the requester agent 102 in messages 122. The producer component 112 includes business logic 114 for producing the information. For example, the business logic may generate the information internally, it may request the information from external sources, such as for example databases, it may produce the information based on information it has received from a different producer agent, etc. In addition to the business logic 114, the producer component 112 also includes interface logic 116 for implementing the interface definition, referred to as an interface implementation 116 that implements the same interface definition 120 used by the requester agent 102. Although the requester agent 102 and the producer agent 110 both implement the same interface definition, the implementations are different as each implements one side of the communication interface. In addition to the producer component 112, the producer agent may include further components, such as further producer components for communicating with additional requester agents.

In the above pseudo code listing of the requester component of an agent, the business logic 106 of the requester component 104 may be considered the pseudo code for receiving a request to display an employee's name associated with an employee number (i.e., "displayEmployee(num: Integer)") and the pseudo code for displaying the employee name (i.e., "display(employee.Name)" and "display(employee.ID)"). The interface logic 108 for using the interface definition, may be considered the pseudo code for sending the employee ID number to the producer component of a producer agent 110 and receiving the employee information in response (i.e., "employee=providerAgent.getEmployee (num)"). Similarly, the business logic 114 of the producer component 112 may be considered the pseudo code for determining the employee name associated with the employee ID number (i.e., "employeeInfo=infoOfEmployeeNumber(employeeNumber)"). The interface logic for implementing the interface definition, that is the interface implementation 116, may be considered the pseudo code for receiving the employee number (i.e., "employeeInformation getEmployee (employee Number: Integer)") and the pseudo code for returning the employee information in response (i.e., "return employeeInfo").

Figure 2:
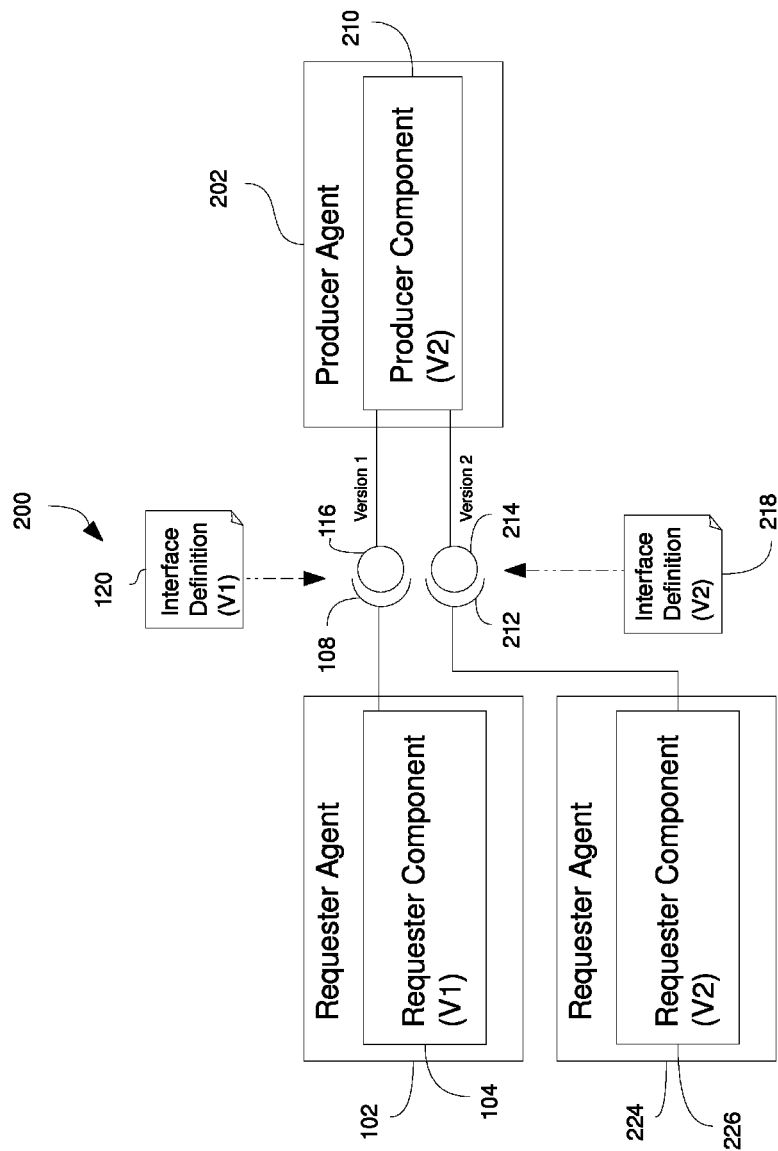
FIG. 2 depicts further illustrative components of an SOA application, in accordance with the present disclosure.

Referring to FIG. 2, there is shown an SOA application 200. The SOA application 200 comprises a producer agent 202 and two requester agents 102, 224. The producer agent 202 and requester agents 102, 224 may be implemented using computer hardware including a processor for executing instructions stored in memory. The components of the SOA application 200 may be provided by executing instructions stored in the memory. The requester agent 102 comprises a requester component 104 that uses an old version of the interface 116, described by the interface definition 120. The requester agent 224 comprises a requester component 226 that uses a new version of the interface 214, described by interface definition 218. The producer agent 202 is similar to the producer agent 110, however the producer agent 202 has two interface implementations 116,214, from which messages for the producer component 210 may be received. Each interface implementation 116,214 implements the interface described by the separate interface definitions 120,218. For the purposes of this description, it is assumed that interface definition 120 is an earlier version (the old version) of interface definition 218 (the new version). For example, the old version of the interface definition 120 may be the example interface described above for returning an employee's information associated with an employee ID number. The new version of the interface definition 218 may include the getEmployee method; however, it may be modified to return, in addition to the employee name and ID number, the department the employee works in. A new version of the example interface definition is shown in the following listing.

Example Interface Definition V2:
    Method name: getEmployee
        input: employeeNumber: Integer
        output: employeeInfo: employeeInformation
    Type name: employeeInformation
        Name: String
        ID: Integer
        Department: String The old requester agent 102 can send and receive information, using the interface logic 108 of the requester component 104, to the producer agent 202, which implements the interface 116 used by the requester agent 102. The producer agent 202 may pass the received messages to the producer component 210. The messages sent between the requester agent 102 and the producer agent 202 conform to the old interface definition 120.

The new requester agent 224 can send and receive information, using the interface logic 212 of the requester component 226, to the producer component 210, of the producer agent 202, which implements the interface 218 used by the requester agent 224. The messages sent between the requester agent 224 and the producer agent 202 conform to the new interface definition 218.

Figure 3:
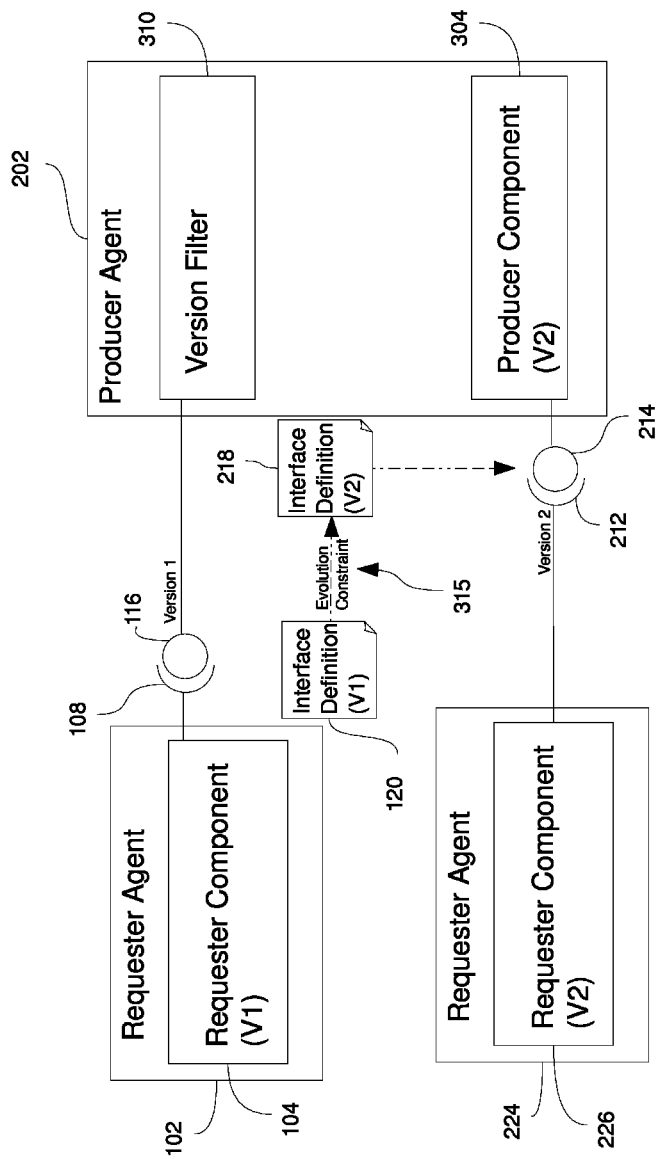
FIG. 3 depicts illustrative components for supporting multiple versions of an interface in an SOA application, in accordance with the present disclosure.

Referring to FIG. 3, there is shown components for supporting multiple versions of an interface in a producer agent. The producer agent 202 includes a new producer component 304 that implements 214 the new version of the interface definition 218. The new producer component 304 does not implement the old interface definition 120. This may help to simplify the creation and maintenance of the new interface definition 218, and corresponding implementation 214 by the producer component 304.

The new requester agent 224 can communicate directly with the new producer component 304 of the producer agent 202 using the interface implementation 214 of the new interface definition 218. Messages sent using the interface 214 conform to the new interface definition 218. The old requester agent 102 includes a requester component 104 that uses the old interface 116. The old requester agent 102 does not communicate directly with the new producer component 304 since they do not implement the same interface. Support for the old requester agent 102 is achieved without requiring the new producer component 304 to implement the old interface definition 120. A version filter 310 has been added to the producer agent 202, and can send and receive messages to and from the new producer component 304. The messages passed between the version filter 310 and the new producer component 304 conform to the interface definition 218. The version filter 310 implements 116 the old interface definition 120, and so can communicate directly with the old requester agent 102. The version filter 310 passes messages it receives from the old requester agent 102 to the new producer component 304 of the producer agent 202. The version filter 310 also passes messages from the new producer component 304 to the old requester agent 102; however, the version filter 310 first strips any information in the message conforming to the new interface definition 218 that is not found in the old interface description 120. By passing messages received from the old requester agent 102 to the new producer component 304, and by filtering new information from messages sent from the new producer component 304 to the old requester agent 102, the version filter 310 provides support for multiple versions of requester agents 102,224 to communicate with the new version of the producer component 304. The use of the version filter 310 provides flexibility in creating new interfaces since a version filter can be used to maintain support for the older requester agents 102.

In a broad sense, the version filter 310 acts as a bridge between message formats, receiving messages of one format and transforming them to another format. However, to overcome the difficulty of writing a new filter for transforming messages from each old version to the new version of the interface definition, an evolution constraint 315 is introduced. The evolution constraint 315 is a rule or collection of rules that describes how the old version of the interface definition 120 can be modified to create the new version of the interface definition 218. Broadly, the evolution constraint 315 requires that the new interface definition 218 be a superset of the old interface definition 120. This allows messages received from the old requester agent 102 to be passed directly to the new producer component 304 using the version filter 310, and messages to be sent from the new producer component 304 to the old requester agent 102 to be passed through the version filter 310 which filters out any information in the response message that is not defined in the old interface definition 120.

The evolution constraint 315 may be more specific. It can specify that the definition of messages sent from the old requester agent 102 to the new producer component 304 cannot change, and that the definition of messages that are sent from the new producer component 304 to the old requester agent 102 can only be added to, that is the messages include all of the information of the old interface description 120 and may include additional information. The added information in the response message may be removed from response messages sent to the old requester agent 102 by the version filter 310 which creates a response message that conforms to the old interface definition 120. This results in the new producer component 304 being able to process messages sent from the old requester agent 102 and provide responses according to the new interface definition 218, which are stripped of additional information and returned to the old requester agent 102 in a response message that conforms to the old interface definition. As such, the old requester agent 102 passes the messages to the version filter 310, which may pass the message directly to the new producer agent without processing the message. The filter may be designed to add or remove information to the request message; however, the evolution constraint may need to be more complex, for example, defining a default value for new information to be added to the request message, so that the message conforms to the new interface definition implemented by the new producer component 304. The new producer component 304 receives the message that conforms to a request message defined by the new interface definition 218, processes it, and returns a message conforming to the new interface definition to the version filter 310. The version filter 310 receives the message and filters out the new information not supported by the old requester agent 102 and sends the message to the old requester agent 102. Due to the loose coupling of components in an SOA application, an old producer agent can be replaced with the version filter 310 without requiring any changes be made to the old requester agent 102 since both the old producer agent and the version filter 310 implement the same interface. This can greatly simplify the upgrading, maintenance and support of SOA applications.

The illustrative new interface definition listed above is a properly constrained evolution of the previous illustrative interface definition. The definition of messages received from requesters has not changed, namely getEmployee still sends an Integer. As such the old and new versions can communicate this information. However the response to the message has changed. The employeeInformation type has been augmented to include the additional information for the employee's Department. However, it conforms to the evolution constraint 315. The version filter 310 transforms the new version of the message to the old version by stripping the Department information of the employee from the new version of the message.

The version filter 310 has been described as passing messages received from old requester agent 102 to the new producer component 304 without processing them. If, however, the evolution constraint allows the request messages of the new interface definition to have new information, the version filter may process the received messages prior to sending them to the new producer agent. This processing may include, for example, adding default values to the received messages for the new information required by the new interface definition. Similarly, the request message could be processed to strip information from the message not used by the new interface. The evolution constraint may need to specify the default values to be added to request messages if they are allowed to include new information.

Figure 4:
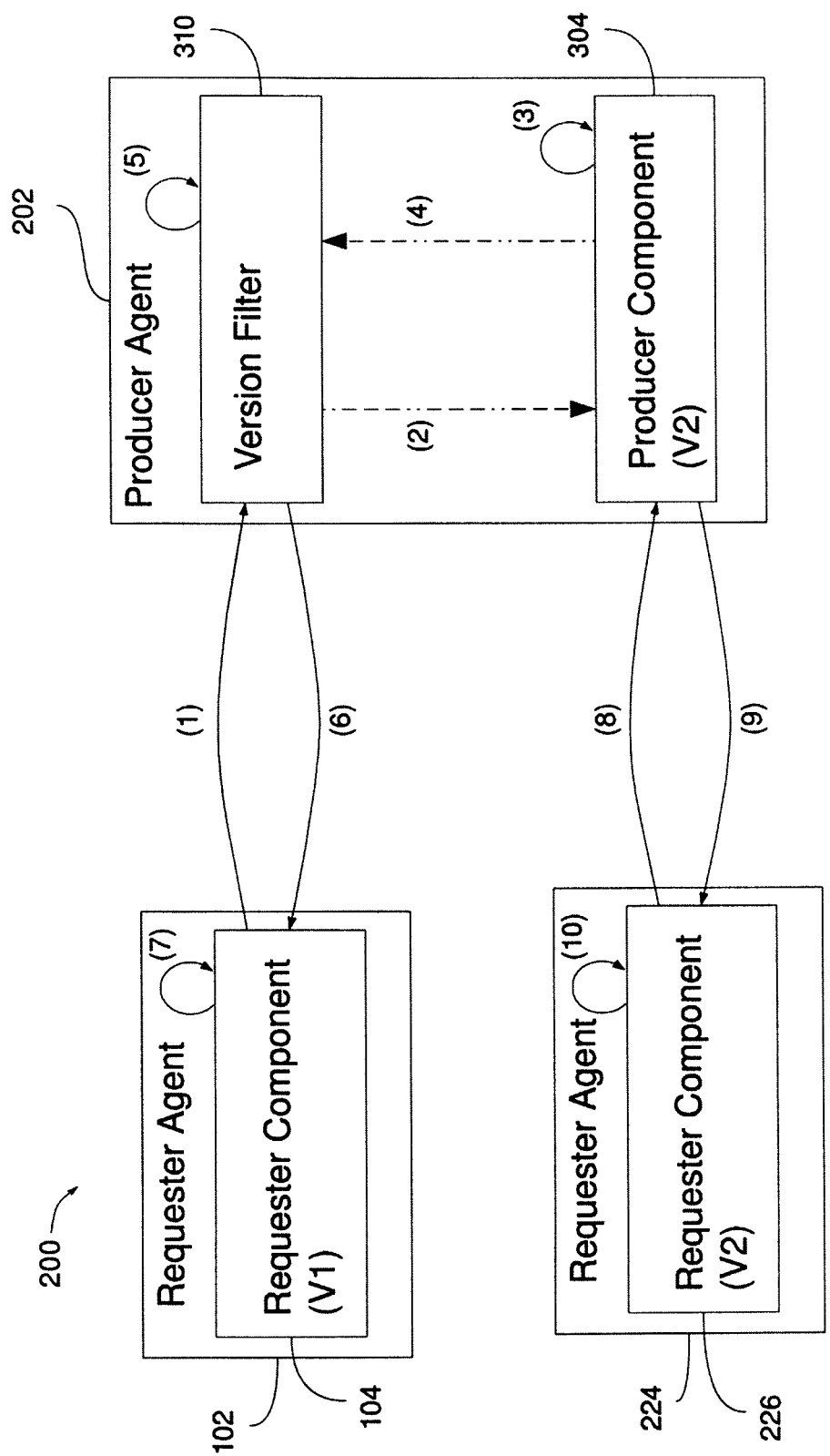
FIG. 4 depicts an illustrative communication between components of an SOA application supporting multiple versions of an interface, in accordance with the present disclosure.

Referring to FIG. 4, there is shown the communication between components of the SOA application. The producer agent 202 comprises a version filter 310 and a new producer component 304 as described above with reference to FIG. 3. The SOA application 200 comprises an old requester agent 102 and a new requester agent 224 as described above with reference to FIG. 2 and FIG. 3. For the sake of clarity, the communication between the new producer component 304 and the old requester agent 102 and the communication between the new producer component 304 and the new requester agent 224 are described as occurring separately. It is understood that the processing of messages may be interleaved, or multiple agents may be supported to process multiple messages concurrently.

The requester component 104 of the old requester agent 102 sends a message conforming to the old interface definition (1). The old requester agent 102 sends the message to the location that the old producer component was previously found and which the old requester agent 102 is configured to use. The old producer component has been replaced at the producer agent 202 with the version filter 310, and so the message arrives at the version filter 310. The version filter 310 implements the same interface as the old producer component, and as such the old requester agent 102 does not need to know a change has been made. As a result of the evolution constraint, the new producer component 304 can process the old request message, and so the version filter 310 passes the request message on to the new producer component 304 (2) without processing it. The new producer component 304 processes the message to produce a response (3). The response message to the request message is sent to the version filter 310 (4). The response message conforms to the new interface definition 218 and includes additional information not described in the old interface definition 120. The version filter 310 processes the received response message (5). The processing strips the additional information from the received response message to create a stripped response message conforming to the old interface definition 120. The version filter 310 sends the stripped response message conforming to the old interface definition 120 to the old requester agent 102 (6).

The old requester agent 102 receives the stripped response message and consumes the information (7), for example, displaying the information.

The requester component 226 of the new requester agent 224 implements the new version of the interface definition 218, and as such can communicate directly with the new producer component 304. The new requester agent 226 sends a request message to the new producer component 304 (8). The request message conforms to the new interface definition 218. The new producer component 304 receives the request message and processes it (3). The new producer component 304 sends a response message back to the requester component 226 of the new requester agent 224 (9). The new requester agent 224 receives the message conforming to the new interface definition 218 and processes it (10), for example, displaying the information.

The new requester agent 224 is able to communicate directly with the new producer component 304, since both share the same common version of the interface description. In order to communicate with the producer component 304, the new requester agent requires information about where the new producer component 304 is located. This information can be included in the interface definition. For example, if the interface definition is described using WSDL, the "services" section of the WSDL can be included, which describes a Universal Resource Identifier (URI) defining the location of the new producer component 304. Requester agents may be configured to send request messages to the specified URI.

From the above description, it is clear that if the interface definition changes in accordance with an evolution constraint, support for multiple versions of the interface can be provided efficiently through a version filter. Furthermore, by implementing the version filter 310 external to the new producer component 304, only communication between the old requester agent 102 has to pass through the version filter 310. Any new requester agents can communicate directly with the new producer component 304. The new producer component 304 does not differentiate from the messages received and processed from new requester agents and old requester agents through the version filter 310. It is possible to remove the version filter 310 at any time, without disturbing the operations of the new requester agents or the new producer components. For example, support for old, previous versions of an interface can be removed after a sufficient amount of time has passed to allow all requester agents to be upgraded to a newer version by simply removing the version filter 310.

Figure 5:
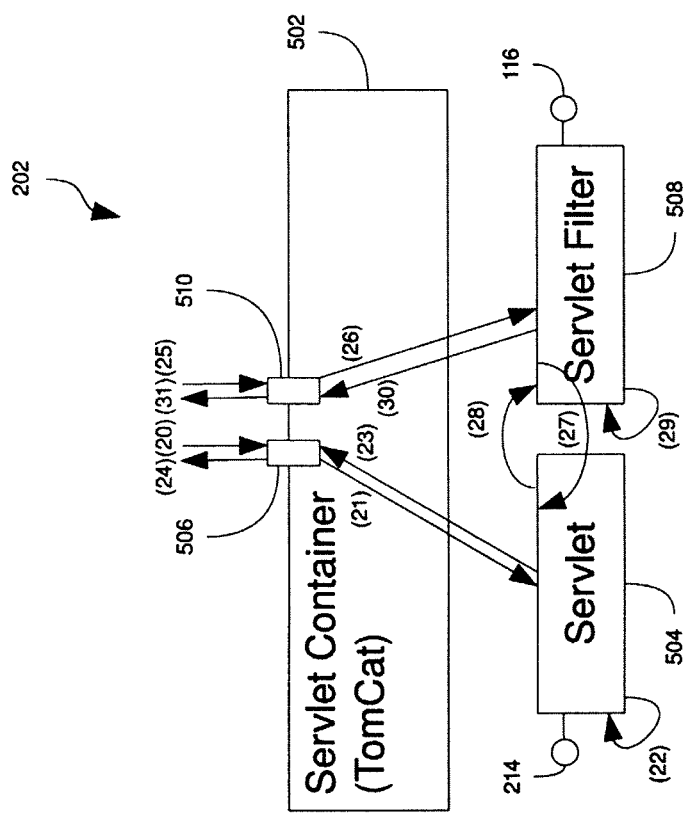
FIG. 5 depicts an illustrative embodiment of a server supporting multiple versions of an interface, in accordance with the present disclosure.

Referring to FIG. 5, there is shown an illustrative embodiment of a producer agent in accordance with the present disclosure. The producer agent 202 comprises a servlet 504 and a servlet filter 508. The servlet 504 and the servlet filter of the producer agent 202 integrate with the facilities provided by a servlet container 502. The servlet container 502 provides a framework for servlets to operate in. A producer agent, such as producer agent 110, may be implemented as a servlet and servlet filter configured and operating within a servlet container. A servlet 504 can be registered to be run by the servlet container 502. The registration of a servlet 504 may include specifying an address or URI that messages are sent to for processing by the servlet. Servlet filter 508, can be registered with the servlet container 502 in a similar manner. The servlet filter 508 may be registered to process messages sent to the URI previously registered to the old producer component.

The servlet container may provide functionality to the servlet and servlet filter that, for example, handles the message passing between senders and the servlet and servlet filter. The servlet filters may be chained together, with each servlet filter in the chain processing the message prior to being processed by the servlet. The servlet container maintains these filter chains as well as the passing of messages between servlet filters of the chain, as the servlet filters typically have no knowledge about other servlet filters.

The servlet filter 508 implements 116 the old interface definition. The servlet container 502 receives the messages destined for an address or URI and passes them on to the servlet 504, or the servlet filter 508 registered for processing messages sent to that URI. A message from a servlet filter can be passed onto another servlet filter. A message from a servlet filter may also be passed to a servlet. The passing of messages between servlet filters and servlet may be provided by the functionality of the servlet container 502.

The servlet container 502 depicted in FIG. 5 may be implemented using various technologies, such as an Apache Tomcat container. The servlet container 502 provides the framework for the servlet 504 and servlet filter 508. The servlet 504 is registered with the servlet container 502, and associated with a location or URI 506 that messages are received at. The servlet 504 provides the interface implementation 214 of the new interface definition 218. The servlet container 502 also provides the framework for the servlet filter 508. The servlet filter 508 is registered with the servlet container 502, and associated with a location or URI 510. The location 510 may be the same location that the old version of the producer component implemented in the servlet 504 was associated with. This allows old requester agents to communicate with the servlet filter 508 which processes the message, before being passed to the new servlet 504, without requiring any changes to the old requester agent. The servlet filter 508 provides the interface implementation 116 of the old interface definition 120 used by the old requester agent.

When a message arrives at the new location 506 (20), the servlet container 502 passes the message to the servlet 504 (21) associated with the address through the servlet registration. The servlet agent 504 receives the message and processes it (22) as described above. The response message is returned to the servlet container (23) and sent to the new requester agent that sent the request message (24).

When a message arrives at the old location 510 (25), the servlet container 502 passes the message to the servlet filter 508 (26). Assuming the evolution constraint of the interface definitions allow the input messages to remain the same, the servlet filter 508 passes the message to the servlet 504 (27) without processing it. The message may be passed from the servlet filter 508 to the servlet agent 504 though the servlet container 502. The servlet agent 504 processes the message (22) and prepares a response message. The response message, which conforms to the new version of the interface definition 218 is sent to the servlet filter 508 (28) through the servlet container 502, which processes the message (29). The processing of the message may include stripping additional information not present in the old version of the interface definition 120. The stripped message is returned to the servlet container (30) and returned to the old requester agent that sent the request message (31).

Figure 6:
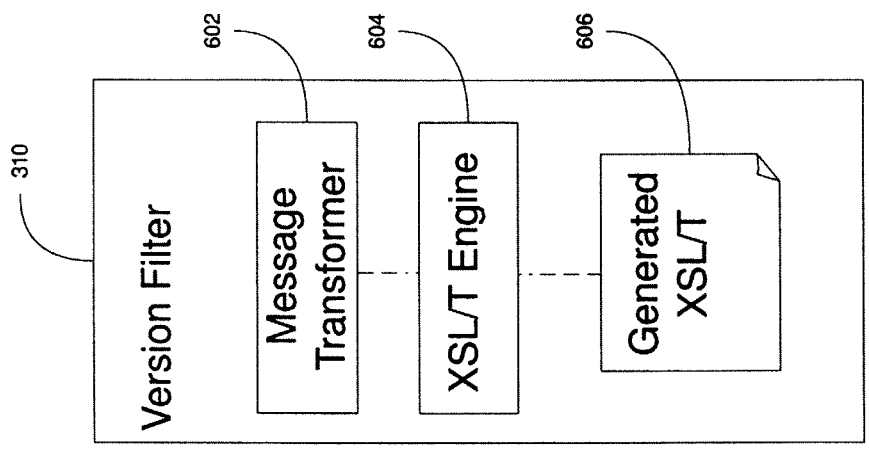
FIG. 6 depicts illustrative components of a version filter, in accordance with the present disclosure.

Referring to FIG. 6, there is shown components of an illustrative version filter 310 in accordance with an embodiment the present disclosure. The version filter 310 comprises a message transformer 602 that sends and receives messages that conform to the old interface definition 120. The version filter 310 described is intended to process XML messages, such as those sent in SOAP messages over HTTP. It is understood that the XML messages do not need to be sent in a SOAP message over HTTP. For example, the XML message could be sent as part of a Multipurpose Internet Mail Extension (MIME) message. In such a case, pre-processing of the MIME message may be required to identify the XML message. The XML message component of the MIME message may be extracted and processed by the version filter. The response message may be inserted into the MIME message and returned.

When the messages are expressed in XML, the filter can use an XSL/T engine 604 and a generated XSL/T document to transform the messages from one version to another. The message transformer 602 may then pass received messages to the XSL/T engine 604 which processes them to transform them into a message conforming to the appropriate version of the interface definition. The message transformer 602 then passes the transformed message to the appropriate location, for example, the old requester agent 102. As described above, messages received from the old requester can be passed directly to the new producer agent, while messages received from the new producer agent are processed by the XSL/T engine 604 to produce the stripped message, which is then sent to the old requester agent 102. The message transformer 602 may pass request messages to the XSL/T engine for processing if needed, for example, to add default values to the message. Although the message transformer 602 may add a default value to a message, it may be more appropriate or efficient to implement the servlet agent or the producer component 304 to add the default values to the messages.

Figure 7B:
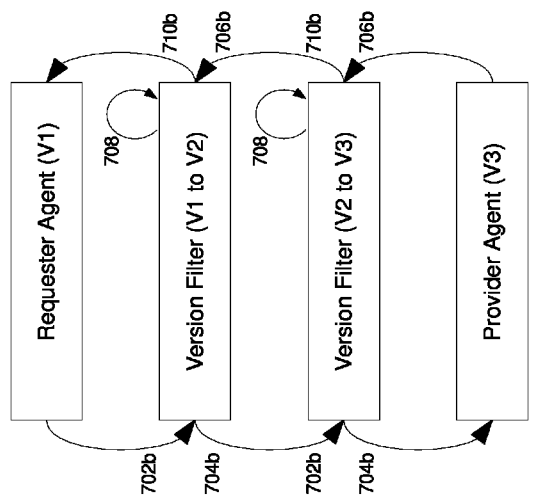
FIG. 7b depicts in a message flow diagram a method of processing a message by a provider agent in accordance with the present disclosure.
Figure 7A:
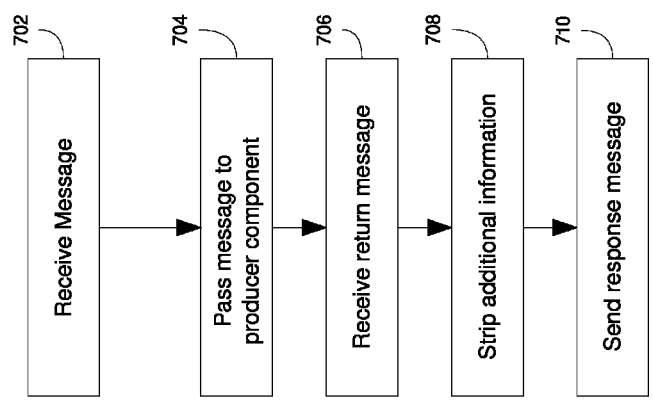
FIG. 7a depicts in a flow chart an illustrative method of processing a message by a version filter, in accordance with the present disclosure.

FIG. 7a depicts in a flow chart an illustrative method of processing a message by a version filter, in accordance with the present disclosure. The method begins with receiving a message at a version filter of a server (702). The version filter of the server implements a first interface definition describing the interface used by a requester agent communicating with the version filter. The received message conforms to the first interface definition. The method passes the received message to a producer component (704) implementing a second interface definition. The second interface definition is constrained to be a superset of the first interface definition, so that the second interface definition includes all of the interface provided by the first interface definition. The version filter passes the received message to the producer component according to the second interface definition. Since the second interface definition has been constrained to be a superset of the first interface definition, the received message does not need to be processed or changed by the version filter. The method receives a return message from the producer component (706) at the version filter. The return message is in response to the received message and will typically contain the requested information, or information indicating an error. The return message returned from the producer component conforms to the second interface definition. Since the second interface definition is a superset of the first interface definition, the return message may contain additional information not included or defined in the first interface definition. The method then strips the additional information from the return message (708) to generate a response message. The information stripped from the response message is additional information defined in the second interface definition and not the defined in the first interface definition. The response message conforms to the first interface definition. The method then sends the response message in response to the received message (710). The response message may be sent to a requester agent that sent the received message. The requester agent may be implemented on another computer and communicate with the server through a network.

FIG. 7b depicts in a message flow diagram a method of processing a message by a producer agent in accordance with the present disclosure. The method depicted in FIG. 7b uses multiple version filters as processing links in a processing chain that process messages. Each version filter in FIG. 7b implements a method similar to that described with reference to FIG. 7a; however, instead of the passing the message to the producer component (704) as described, the message is sent to the next processing link in the processing chain (704b). The version filters may also receive messages from a previous processing link in the processing chain (702b), instead of from the requester agent (702). Similarly, receiving the return message (706) does not necessarily need to be a return message from the producer agent, it may be a return message from the previous processing link in the processing chain (706b). Each of the version filters may strip the additional information from the received return messages (708) and send the response message to the previous processing link in the processing chain (710b) instead of sending the response message to the requester agent (710). This message passing between processing links in the processing chain may be coordinated by the servlet container.

Although FIG. 7b depicts the chaining of multiple version filters together, this approach will add to the processing cost since each filter needs to parse, process and serialize the response. It would be more efficient to have separate version filters to translate messages from the newest interface definition used by the provider agent to some older interface definition used by one or more requester agents.

The processing of the response message by version filters can use the XSL/T engine to strip any information present in the new interface definition out of the message that is not present in the old interface definition 120. The processing results in a stripped message as the response which may be returned from the XSL/T engine to the message transformer 602, which passes the message onto the requester agent 102. To produce a different version filter, it is only necessary to provide a different XSL/T document 606 that describes how to transform messages from one version to the other version.

If the messages are expressed in XML, the version filter 310 may transform the message using the message transformer 602, the XSL/T engine 604 and the generated XSL/T document 606 as described above. The message transformer 602 and XSL/T engine 604 may be re-used in different version filters 310, for example, for transforming a second older version of the interface definition to the new version of the interface definition, or alternatively, to an intermediary version of the interface. All that is required is a different XSL/T document 606 be generated that describes how to process the messages.

By enforcing the evolution constraint on new versions of interface definitions, it ensures that messages formatted according to the new interface definition can be processed using the XSL/T engine 604 and generated XSL/T document 606 and transformed into the message formatted according to the old interface definition.

The generated XSL/T document 606 is based on the differences between the two versions of the interface definitions 120, 218. The generated XSL/T document 606 may be generated in different ways. For example, depending on the evolution constraint 315 the generated XSL/T document 606 may be written by hand. Alternatively, knowledge of the evolution constraint 315 may be used to generate the XSL/T document 606 as described further below.

New version filters 310 can be generated when a new version of the interface definition is created. Different version filters can be created by simply using a different XSL/T document. Since the XSL/T document 606 can be automatically generated, new version filters can be automatically created when a new interface is defined. The message transformer 602 and XSL/T engine 604 of the version filter 310 can be reused across different version filters.

The generated XSL/T document 606 may be automatically generated, using another XSL/T document, if the interface definitions are expressed in XML and follow the interface evolution constraints described above. An example of a structured language suitable for describing the interface definitions is a Web Service Description Language (WSDL), which is specified in XML.

It will be appreciated that the generated XSL/T document describes how the XSL/T engine of the version filter should process messages conforming to a first interface definition to generate messages conforming to a second interface definition. The version filter may process messages in other ways besides using an XSL/T engine. In such cases, the version filter may use a transformation specification document for describing how the version filter should process the messages. The transformation specification document may include processing logic for processing the messages. For example, processing logic may be added to the transformation specification document for each element in both interface definitions that will cause the version to include the element in the processed message. Alternatively, the processing logic may indicate to the version filter which elements to exclude when processing messages. When the transformation specification document is a generated XSL/T document, the processing logic of elements may be XSL/T templates.

Referring to FIG. 8a, there is shown an interface definition 800 expressed in a pseudo WSDL language. Referring to FIG. 8b, there is shown an interface definition 810 expressed in a pseudo WSDL language. The interface definition 800 may be considered the old version of the interface, and the interface definition 810 may be considered the new version of the interface. The interface definitions 800,810 do not adhere to the formal WSDL requirements, rather they use a pseudo-WSDL type language to express the message and types in a clear manner, in order to highlight the addition of information in the new interface definition 810. The interface descriptions of FIGS. 8a and 8b are similar to the illustrative interface descriptions of above; however, generic names have been used. One skilled in the art will appreciate that a complete WSDL interface definition will include additional elements, such as particular bindings for specifying the location of services or agents for sending and receiving messages to and from.

The old interface definition 800 and the new interface definition 810 each include three sections of an interface definition expressed using pseudo-WSDL. They are "types" 802, "messages" 804 and "porttypes" 806. Generally, both interface definitions describe data types in the types section 802. The data types describe the type of information that is exchanged between the requesters and producers (or whatever components implement the interface definition). The types are used in the message section of the interface definition. The message section 804 describes the structure of messages that can be sent between the agents that implement and use the defined interfaces. The structure of the messages comprise one or more data types, which may be defined in the types section 802 of the interface definition, or may include predefined types, such as the simple types "integer" or "string". It is understood that the interface definition may refer to other namespaces that include the predefined types. The messages are used in porttypes section 806. A porttype refers to supported operations. The operations are described by the messages that are sent between the agents. Porttypes in WSDL can contain one or more operations, which may refer to an input message, an output message, and fault messages, in any combination. This can allow requester agents to send information to the producer agents, without requiring the producer agent to respond, or for the producer agent to send information to a requester agent without being requested. The operations of interface definition may also indicate that both input and output messages are part of the porttype. For example, an agent may receive a request for information in an input message, and send the response in an output message. By implementing and using the interface definition, agents can send and receive messages to other agents which will be able to process the message appropriately.

The interface definition 810 differs from the interface definition 800 only in the type sections 802. Although interface definition 810 differs from the interface definition 800 only in the type sections 802, other changes are possible; for example, new port types, operations and messages could be defined in the new interface definition 810. As with the examples listed above, the old interface definition describes a method that receives an integer and responds with a string and integer. The evolution of the old interface definition to the new interface definition has been constrained, and only adds new information to the response message. That is, the type of the output message now includes, in addition to the string and integer of the old version, a new string, namely "varC". In addition to the new information for the response message of an existing method, the new interface definition may describe new methods and new types; however, the version filter does not need to consider these new types and methods since no message sent from an old requester agent will use the new methods or types.

Since the new version of the interface definition 810 conforms to the evolution constraint, with respect to the old interface definition 800, an XSL/T document may be generated automatically to be used by the XSL/T engine of the version filter. In order to automatically generate the XSL/T document, knowledge of the evolution constraint is used. Since the new version of the interface definition only adds to the old version of the interface definition, any elements in the new version of the interface definition not found in the old version have been added. The messages according to the new version of the interface definition should be stripped to remove the added elements.

Figure 9:
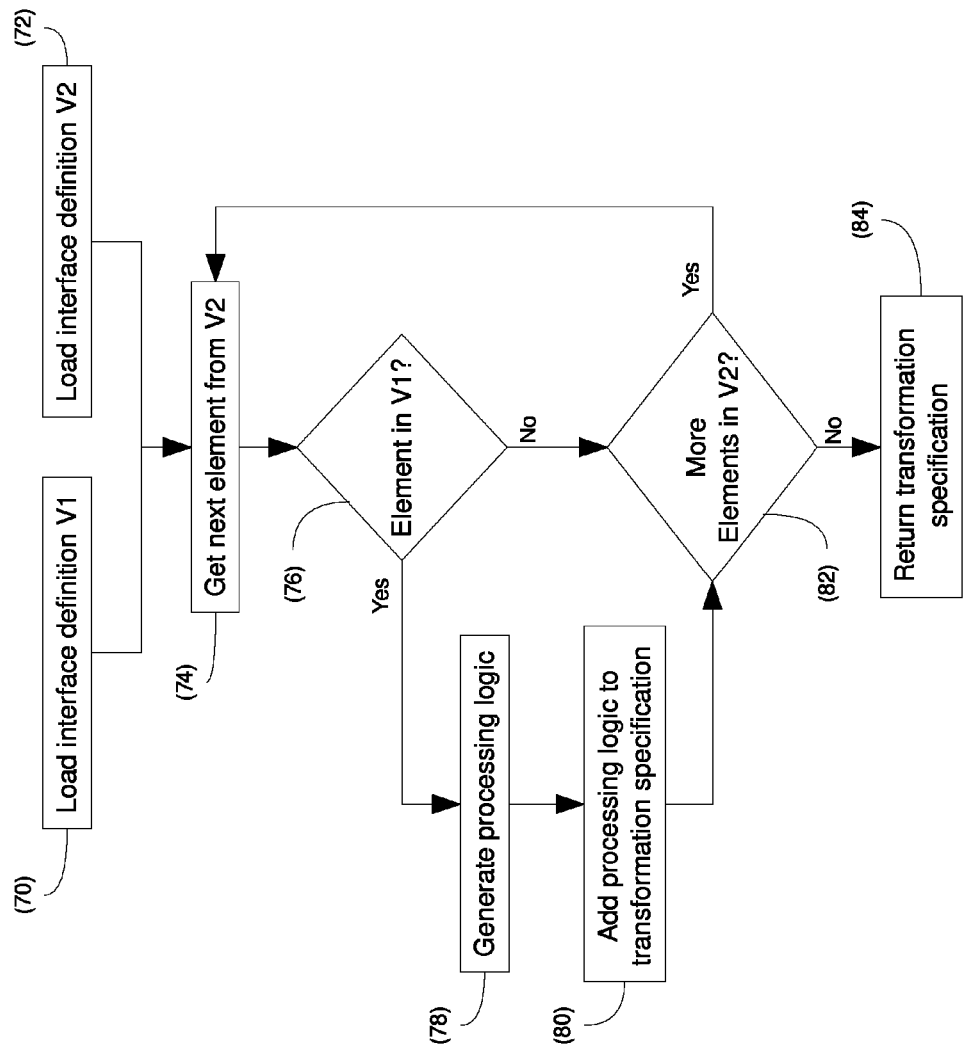
FIG. 9 depicts a flow chart of an illustrative method of generating a generated transformation specification document, in accordance with the present disclosure.

Referring to FIG. 9, there is shown a flow chart of a method for automatically generating a transformation specification document. The method begins by loading the old version of the interface definition 800 (70) and the new version of the interface definition 810 (72). The interface definitions may be loaded as a Document Object Model (DOM) tree. The method gets the next element of the new version of the interface definition (74). If the method has just started, the next element will be the first element in the interface definition, for example, the root node of the DOM tree if used. It is then determined if the element is found in the old version of the interface definition (76). If the element is found in the old version of the interface definition (Yes at 76), processing logic is generated (78) for the element that has been added to the new version of the interface definition. The processing logic specifies which elements to copy from messages conforming to the new version of the interface definition when generating messages to conform to the old version of the interface definition. The processing logic is then added to the transformation specification document (80) to be used by the version filter when generating messages conforming to the old version of the interface definition from messages conforming to the new version of the interface definition. Next, the new version of the interface definition loaded into memory is checked to determine if there are more elements (82). If there are more elements (Yes at 82), processing returns to get the next element (74). If the element is determined not to be in the old version of the interface definition (No at 76), nothing further is required, as this element should not be found in messages conforming to the old version of the interface definition, and processing continues to determine if there is another element in the new version of the interface definition (82). If there are no more elements (No at 82), the transformation specification document is returned (84), which will include processing logic for the elements to be copied from messages conforming to the new version of the interface definition when generating messages conforming to the old version of the interface definition.

The processing logic added to the transformation specification document according to the method described with reference to FIG. 9 indicate explicitly which elements to copy from the new version messages to the old version messages. The default action for elements not explicitly specified in the transformation specification document is to not copy them. Alternatively, the transformation specification document may be created so that the default action is to copy all elements from messages conforming to the old version of the interface definition when generating messages conforming to the new version of the interface definition. In such a case, the processing logic added to the transformation specification document will explicitly indicate the elements that are not to be copied. In such a case, the method described with reference to FIG. 9 would be altered so that the processing logic is generated (78) and added to the transformation specification document (80) when the element is not in the old version of the interface definition. Regardless of whether the transformation specification document specifies explicitly which elements to copy, or which elements to delete, it will be appreciated that the transformation specification document has processing logic that cause the added element to be removed from messages conforming to the new version of the interface definition to create messages conforming the old version of the interface definition.

A method for generating a generated XSL/T document is described below. The method generates the generated XSL/T document in 2 passes based on the new and old versions of the interface definitions loaded into memory. The first pass processes complex types and simple types and their interface elements and generates a first pass result tree marking the types and their interface elements as requiring processing or deletion. The second pass makes a final determination as to what types need processing based on the first pass result tree. The second pass accounts for base types of complex types that are not accounted for in the first pass.

The first pass goes through the new version of the interface definition and for each complex type in the new interface definition that does not have simple content and is not a restriction of another type in the new interface definition, the method marks the complex type for deletion if it does not exist in the old version of the interface definition. If the complex type does exist in the old version of the interface definition, the method goes through each interface element in the complex type in the old version of the interface definition, and if the interface element does not exist in the new version of the interface definition it is marked to indicate that the old interface element is not in the new version of the interface definition. The method also goes through each interface element of the complex types in the new interface definition and, if the interface element does not exist in the complex type of the old interface definition, marks the interface element as not being in the old interface definition.

Once all of the complex types in the new interface definition that do not have simple content and are not restrictions of other types are processed, the method reports any interface elements marked as being in the old interface definition but not in the new interface definition as a violation of the evolution constraint. The method then builds processing rules for the complex types in the new version of the interface definition. The complex type is marked for deletion if it does not exist in the old interface definition. The complex type is marked as requiring processing if any interface elements in the complex type of the new interface were marked as not being in the complex type of the old interface. For any interface elements in complex types of the new interface definition marked as requiring processing, the method marks the interface element of the complex type as requiring processing if the interface element exists in the old interface definition, and marks the interface element for deletion if it does not exist in the old version of the interface definition.

The first pass of the method also processes each simple type of the new version of the interface definition in a similar manner as complex types. The first pass goes through the new version of the interface definition, and for each simple type in the new interface definition, the method marks the simple type and its enumeration elements for processing or deletion. If the simple type of the new interface definition exists in the old version of the interface definition, the method goes through each enumeration element in the simple type in the old version of the interface definition, and if the enumeration element does not exist in the new version of the interface definition, it is marked to indicate that the old enumeration element is not in the new version of the interface definition. The method also goes through each enumeration element of the simple type in the new interface definition and, if the enumeration element does not exist in the simple type of the old interface definition, marks the enumeration element as not being in the old interface definition.

Once all of the simple types in the new interface definition are processed, the method reports any enumeration elements marked as being in the old interface definition but not in the new interface definition as a violation of the evolution constraint. The method then builds processing rules for the simple types in the new version of the interface definition. The simple type is marked for deletion if it does not exist in the old interface definition. The simple type is marked as requiring processing if any enumeration elements in the simple type of the new interface were marked as not being in the simple type of the old interface definition. For any enumeration elements in simple types of the new interface definition marked as requiring processing, the method marks the enumeration element of the simple type as requiring processing if the enumeration element exists in the old interface definition, and marks the enumeration element for deletion if it does not exist in the old version of the interface definition.

After generating the first pass result tree, the method generates a second pass result tree using the information in the first pass result tree. For each type (both complex types and simple types), the method makes a final determination regarding whether the type requires processing by examining the type and each of its base types.

Types in the second pass result tree will either be marked for deletion, marked for processing, or not marked. Types that are unchanged between the two versions of the interface definition are unmarked and will be processed by a default XSL/T template in the generated XSL/T document. The default template copies the element of an unchanged type and then processes all of the contained elements. If an element is marked for deletion, an XSL/T template is generated for the element in order to avoid the element being processed with the default XSL/T template; however, the XSL/T template does not process any of the element, and so the element will not be copied to the generated message. If an element is marked for processing, an XSL/T template is generated that copies the element and then selectively processes the appropriate set of contained elements.

As described above, the generated XSL/T document may copy all elements by default and explicitly exclude the types and elements marked for deletion. Alternatively, the default XSL/T template may not copy any types or elements, and so the elements marked for processing or that are unmarked must be processed by an XSL/T template while the types and elements marked for deletion may be processed by the default XSL/T template.

The generated XSL/T document to process messages is created by analyzing the two interface definition documents as described above and generating XSL/T templates that will process the content of the messages that is defined in both interfaces. One form of content processing copies the content from the received message to the processed message. For each complex type and simple type in the new interface, if the type does not exist in the old interface, nothing is done, which will mean that the type will not be output, or in other words the information is stripped, by the filter when generating the message conforming to the old interface definition. If the type does exist in the old interface definition, an XSL/T template is generated and added to the generated XSL/T document that will pull information from messages conforming to the new interface definition and copy it to messages conforming to the old interface definition. When the XSL/T templates are being generated for handling the types, the base class elements are handled, and the XSL/T template is generated to process elements marked for processing in the second pass result tree. Unmarked elements may be processed by the default XSL/T template which copies the elements. Elements marked for deletion are excluded from being copied with an XSL/T template that does nothing, in order to avoid the elements being copied and processed by the default XSL/T template.

In order to be able to exclude information when generating the old version of the response, knowledge of the hierarchy of the interface definition must be known. All elements of a type are at the same level in the interface definition, even if some elements are defined in a base class, when excluding information, the base elements would need to be handled in the XSL/T template for each derived type.

Figure 10:
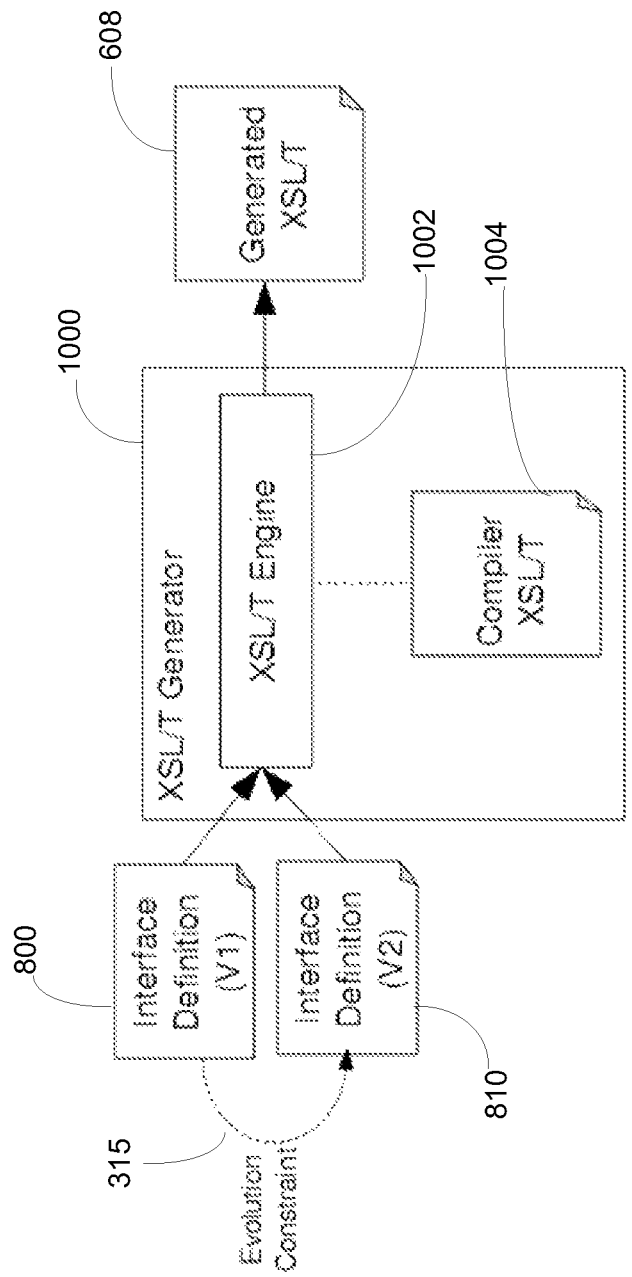
FIG. 10 depicts illustrative components for generating a generated transformation specification document, in accordance with the present disclosure.

Referring to FIG. 10, there is shown a component for automatically generating the generated XSL/T document 606. The XSL/T generator 1000 comprises an XSL/T engine 1002 and a compiler XSL/T document 1004. The compiler XSL/T document 1004 is used by the XSL/T engine 1002 to determine the elements added to the new version of the interface definition, which is shown as the pseudo-WSDL interface definition 810. The XSL/T engine compares the new version of the interface definition 810 to the old version of the interface definition 800 according to the compiler XSL/T in order to determine the added elements of the new interface definition. The compiler XSL/T also describes the template to be added to the generated XSL/T document 606 for the added elements of the new interface definition. The added template of the generate XSL/T document results in the XSL/T engine not copying the added element from a response message when the message is processed by the XSL/T engine 604 of the version filter 310 using the generated XSL/T document 606.

As is understood in the art, an XSL/T engine matches patterns specified in the XSL/T document to patterns in the input documents, and applies templates specified in the XSL/T document and associated with the matched pattern, to generate the output document.

The compiler XSL/T document 1004 is created to use a pattern based on the evolution constraint that the new version of the interface definition will be a superset of the old version. The pattern indicates that the element (or node if a DOM tree is used by the XSL/T element) is in the new version of the interface definition and not in the old version of the interface definition. Associated with the pattern is the template that is added to the generated XSL/T document to strip the matched element from messages.

The use of the XSL/T generator 1000 and the compiler XSL/T document as described can help to reduce development and testing costs associated with new versions. The compiler XSL/T document can be used to automatically generate a generated XSL/T document to produce a version filter. The version filter with the generated XSL/T document may process the messages in a consistent manner.

The compiler XSL/T document can compare any two interface definitions that conform to the interface evolution constraint to produce the generated XSL/T document used by the version filter to convert messages between the two versions.

The above description has referred to SOA applications as including a requester agent or requester communicating with a producer agent or producer. Although the interaction and cooperation between the components form a useful software application as a whole, the individual components may also be considered separate software applications in so far as they can run independently of each other.

Figure 11:
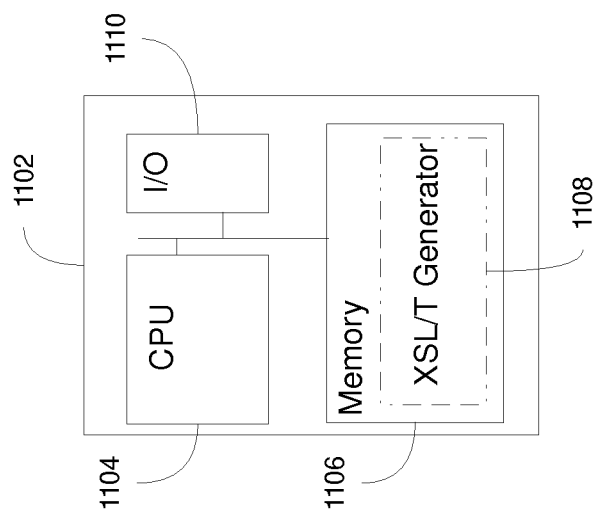
FIG. 11 depicts in a block diagram, illustrative components of a computer system implementing the system and methods in accordance with the present disclosure.

FIG. 11 depicts in a block diagram, illustrative components of a computer that may be used to implement the systems and methods of generating an XSL/T document described herein. The computer 1102 comprises a processor 1104 operationally coupled to a memory 1106. The processor 1104 may also be operationally coupled to one or more input/output (I/O) devices 1110. The processor 1102 may be coupled to either the memory 1106 and/or the (I/O) devices 1110 by one or more buses.

The processor 1104 may be a central processing unit (CPU), a microprocessor, an application specific integrated circuit (ASIC), a field programmable gate array (FPGA) or other type of processor capable of executing instructions. The processor may include the hardware and controlling code such as firmware or basic input/output system (BIOS) used to configure the processor 1104 and other components of the computer 1102. The processor 1104 may be implemented in one or more physical packages. Each package may include one or more processor cores for executing instructions.

The memory 1106 may include different levels of memory, including both volatile and nonvolatile memory for storage of information. The memory 1106 stores instructions and data for providing the computer 1104 with the functionality of a XSL/T Generator as described herein, depicted as XSL/T Generator memory block 1108 in FIG. 11. The memory 1106 may include, for example, registers for storing instructions to be executed by the processor 1104, flash memory, electrically erasable programmable read only memory (EEPROM), random access memory (RAM), hard disk drives (HDD), solid state drives (SSDs), or other types of devices for storing information. The memory 1106 may store the instructions to be executed by the processor to provide the system and method described herein. The instructions may be stored in different levels of the memory at the same time. For example, an instruction may be copied from a HDD to RAM to a register of the processor 1104 prior to being executed by the processor 1104. The results of processing the instruction or instructions may be stored in memory 1106 Storing the instructions of the system and method described herein in the memory 1106 alters one or more characteristics of the memory, such as the electrical characteristics of one or more cells of the memory 1106.

The I/O devices 1110 may include input and output devices. Input devices may include devices for inputting information to the computer 1102, for example, mice, keyboards, keys, switches, cameras, scanners, microphones, touch panels or screens, or other input devices as known by one of ordinary skill in the art. The output devices may display or convey information and may include, for example, monitors, televisions, Braille devices, lights, printers, speakers, actuators and other output devices as known by one of ordinary skill in the art.

The computer buses may include one or more buses for connecting the memory 1106 and I/O devices 1110 with the processor 1104, or each other. The buses may be internal or external buses and may include the physical connectors required to connect components to the buses. Different buses are known, and may include for example, peripheral component interconnect (PCI), PCI express (PCIe), industry standard architecture (ISA), advanced technology attachment (ATA), serial ATA (SATA), small computer system interface (SCSI), universal serial bus (USB), IEEE 1394 (FireWire™). The buses may also include buses for controlling the computer such as a front side bus (FSB), address bus, or control bus.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functionality. It should also be noted that, in some alternative implementations, the functionality noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functionality or acts, or combinations of special purpose hardware and computer instructions.

What is claimed is:

1. A method for generating a transformation specification document describing transformations for transforming a received message to enable communication between first and second agents, wherein the first agent utilizes a first interface definition describing a first application programming interface and the second agent utilizes a second interface definition describing a second different application programming interface, the method comprising:
    comparing elements of the first and second interface definitions to determine additional elements of the second interface definition absent from the first interface definition, wherein the second interface definition is constrained by one or more rules describing permissible differences relative to the first interface definition and the comparing elements identifies violations of the rules;
    generating processing logic for transforming a received message from the second agent conforming to the second interface definition to a message for the first agent conforming to the first interface definition by removing all of the additional elements from the received message not contained in the first interface definition to enable processing of the received message by the first agent and communication between the first and second agents; and
    generating the transformation specification document using the generated processing logic.

2. The method as claimed in claim 1, further comprising:
    loading the first interface definition into a first document object model (DOM) in memory; and
    loading the second interface definition into a second DOM in memory.

3. The method as claimed in claim 1, further comprising:
    processing the first and second interface definitions to indicate types and elements in the second interface definition as being:
    unmarked;
    marked for processing; or
    marked for deletion.

4. The method as claimed in claim 3, wherein the transformation specification document is an extensible stylesheet language transformations (XSL/T) document.

5. The method as claimed in claim 4, wherein processing logic is generated by a XSL/T engine using a compiler XSL/T document, the processing logic including an XSL/T template comprising logic for one of:
    explicitly excluding all of the additional elements of the second interface definition; and
    explicitly including all of the elements of the second interface definition that are not the additional elements of the second interface definition.

6. The method as claimed in claim 5, wherein explicitly excluding all of the additional elements of the second interface definition comprises:
    adding a default XSL/T template to the XSL/T document that copies an unmarked element and processes all elements of the unmarked element;
    adding a XSL/T template to the XSL/T document that copies an element marked for processing and selectively processes contained elements of the element marked for processing that are to be included; and adding a XSL/T template to the XSL/T document to avoid the use of the default XSL/T template for elements marked for deletion.

7. The method as claimed in claim 1, wherein the first and second interface definitions are specified in XML.

8. The method as claimed in claim 7, wherein the first and second interface definitions are specified using WSDL.

9. The method as claimed in claim 8, wherein the first and second interface definitions contain one or more XML schema definitions (XSD).

10. A system for generating a transformation specification document describing transformations for transforming a received message to enable communication between first and second agents, wherein the first agent utilizes a first interface definition describing a first application programming interface and the second agent utilizes a second interface definition describing a second different application programming interface, the system comprising:
  a processor executing instructions; and
  a memory, operatively coupled to the processor, storing instructions, the instructions when executed by the processor operable to:
    compare elements of the first and second interface definitions to determine additional elements of the second interface definition absent from the first interface definition, wherein the second interface definition is constrained by one or more rules describing permissible differences relative to the first interface definition and the comparing elements identifies violations of the rules;
    generate processing logic for transforming a received message from the second agent conforming to the second interface definition to a message for the first agent conforming to the first interface definition by removing all of the additional elements from the received message not contained in the first interface definition to enable processing of the received message by the first agent and communication between the first and second agents; and
    generate the transformation specification document using the generated processing logic.

11. The system as claimed in claim 10, wherein:
  the first interface definition is loaded into a first document object model (DOM) in memory; and
  the second interface definition is loaded into a second DOM in memory.

12. The system as claimed in claim 10, wherein the instructions are further operable to:
  process the first and second interface definitions to indicate types and elements in the second interface definition as being:
    unmarked;
    marked for processing; or
    marked for deletion.

13. The system as claimed in claim 12, wherein the transformation specification document is an extensible stylesheet language transformations (XSL/T) document, wherein the system further comprises an XSL/T engine generating the processing logic using a compiler XSL/T document, the processing logic including an XSL/T template comprising logic for one of:
  explicitly excluding all of the additional elements of the second interface definition; and
  explicitly including all of the elements of the second interface definition that are not the additional elements of the second interface definition;
  wherein the XSL/T template comprising logic for explicitly excluding all of the additional elements of the second interface definition comprises:
    a default XSL/T template to the XSL/T document that copies an unmarked element and processes all elements of the unmarked element;
    a XSL/T template to the XSL/T document that copies an element marked for processing and selectively processes contained elements of the element marked for processing that are to be included; and
    a XSL/T template to the XSL/T document to avoid the use of the default XSL/T template for elements marked for deletion.

14. The system as claimed in claim 10, wherein the first and second interface definitions are specified in XML using WSDL and contain one or more XML schema definitions (XSD).

15. A computer program product for generating a transformation specification document describing transformations for transforming a received message to enable communication between first and second agents, wherein the first agent utilizes a first interface definition describing a first application programming interface and the second agent utilizes a second interface definition describing a second different application programming interface, the computer program product comprising:
  a computer usable memory device having computer usable program code embodied therewith, the computer usable program code comprising:
    computer useable program code configured to compare elements of the first and second interface definitions to determine additional elements of the second interface definition absent from the first interface definition, wherein the second interface definition is constrained by one or more rules describing permissible differences relative to the first interface definition and the comparing elements identifies violations of the rules;
    computer usable program code configured to generate processing logic for transforming a received message from the second agent conforming to the second interface definition to a message for the first agent conforming to the first interface definition by removing all of the additional elements from the received message not contained in the first interface definition to enable processing of the received message by the first agent and communication between the first and second agents; and
    computer usable program code configured to generate the transformation specification document using the generated processing logic.

16. The computer program product as claimed in claim 15, wherein the computer usable program code further comprises:
  computer usable program code configured to load the first interface definition into a first document object model (DOM) in memory; and
  computer usable program code configured to load the second interface definition into a second DOM in memory.

17. The computer program product as claimed in claim 15, wherein the computer usable program code further comprises:
  computer usable program code configured to process the first and second interface definitions to indicate types and elements in the second interface definition as being:
    unmarked;
    marked for processing; or
    marked for deletion.

18. The computer program product as claimed in claim 17, wherein:

the transformation specification document is an extensible stylesheet language transformations (XSL/T) document; and the processing logic is generated by a XSL/T engine using a compiler XSL/T document, wherein the processing logic includes an XSL/T template comprising logic for one of:

explicitly excluding all of the additional elements of the second interface definition; and explicitly including all of the elements of the second interface definition that are not the additional elements of the second interface definition;

wherein the XSL/T template comprising logic for explicitly excluding all of the additional elements of the second interface definition comprises:

a default XSL/T template to the XSL/T document that copies an unmarked element and processes all elements of the unmarked element;

a XSL/T template to the XSL/T document that copies an element marked for processing and selectively processes contained elements of the element marked for processing that are to be included; and a XSL/T template to the XSL/T document to avoid the use of the default XSL/T template for elements marked for deletion.

19. The computer program product as claimed in claim 15, wherein the first and second interface definitions are specified in XML.

20. The computer program product as claimed in claim 19, wherein the first and second interface definitions are specified using WSDL and contain one or more XML schema definitions (XSD).

* * * * *